US008359719B2

(12) United States Patent  (10) Patent No.: US 8,359,719 B2
Jang  (45) Date of Patent: Jan. 29, 2013

(54) SNAP RING HAVING MULTIPLE ROLLERS

(76) Inventor: Ricardo Jang, Cypress, CA (US)

(\*) Notice: Subject to any disclaimer, the term of this patent is extended or adjusted under 35 U.S.C. 154(b) by 390 days.

(21) Appl. No.: 12/643,440

(22) Filed: Dec. 21, 2009

(65) Prior Publication Data

US 2010/0180411 A1  Jul. 22, 2010

(30) Foreign Application Priority Data

Jan. 16, 2009 (KR) .................. 10-2009-0003672
May 8, 2009 (KR) .................. 10-2009-0040268

(51) Int. Cl.
*F16B 45/02* (2006.01)
*A44B 13/00* (2006.01)

(52) U.S. Cl. ............ 24/599.9; 24/599.1; 24/598.7; 43/8; 43/14

(58) Field of Classification Search .......... 24/596.1, 24/598.1, 598.3, 598.4, 598.7, 599.9, 600.1, 24/600.2; 43/7, 8, 14, 104; 114/114
See application file for complete search history.

(56) References Cited

U.S. PATENT DOCUMENTS

| | | | | |
|---|---|---|---|---|
| 44,582 A * | 10/1864 | Balans | ............. | 114/114 |
| 90,113 A * | 5/1869 | McKay | ............. | 114/114 |
| 94,018 A * | 8/1869 | McKay | ............. | 114/114 |
| 100,019 A * | 2/1870 | Eldridge | ............. | 114/114 |
| 104,601 A * | 6/1870 | Kirtland | ............. | 114/114 |
| 3,158,951 A * | 12/1964 | Lewis et al. | ............. | 43/8 |
| 4,894,944 A | 1/1990 | Jimenez | | |
| 5,119,735 A * | 6/1992 | Jang et al. | ............. | 105/151 |
| 5,287,645 A | 2/1994 | Gois | | |
| 5,505,013 A | 4/1996 | Gois | | |
| 5,864,929 A | 2/1999 | Sakong | | |
| 7,320,159 B2 * | 1/2008 | Petzl et al. | ............. | 24/599.5 |
| 7,540,074 B2 * | 6/2009 | Thompson | ............. | 24/600.2 |
| 7,624,483 B1 * | 12/2009 | Jang et al. | ............. | 24/599.1 |
| 7,743,475 B2 * | 6/2010 | Jang et al. | ............. | 24/599.9 |
| D621,242 S * | 8/2010 | Gois, Sr. | ............. | D8/367 |
| 8,060,994 B2 * | 11/2011 | Petzl et al. | ............. | 24/600.2 |
| 8,141,228 B2 * | 3/2012 | Gois, Sr. | ............. | 29/525.01 |
| 2006/0137151 A1 * | 6/2006 | Thompson | ............. | 24/598.2 |
| 2008/0184541 A1 * | 8/2008 | Jang et al. | ............. | 24/599.9 |
| 2010/0088945 A1 * | 4/2010 | Gois | ............. | 43/14 |

\* cited by examiner

*Primary Examiner* — Robert J Sandy
*Assistant Examiner* — Tyler Johnson
(74) *Attorney, Agent, or Firm* — IPLA P.A.; James E. Bame

(57) ABSTRACT

A snap ring for coupling a purse line to a purse seine includes a frame, a plurality of rollers, a frame opening, and a locking unit. The frame is connected to the purse seine. The purse line passes through a second end of the frame. The rollers are rotatably provided in the frame at positions at which the purse line is brought into contact with the frame. The frame opening is formed in one side part of opposite side parts of the frame to open the frame. The locking unit is coupled to the frame to openably close the frame opening. The locking unit includes a first cylinder which is hinged at a first end thereof to the part of the frame which corresponds to a first end of the frame opening.

14 Claims, 14 Drawing Sheets

SNAP RING HAVING MULTIPLE ROLLERS

CROSS REFERENCES

Applicant claims foreign priority under Paris Convention and 35 U.S.C. §119 to Korean Patent Application No. 10-2009-0003672, filed Jan. 16, 2009, and Korean Patent Application No. 10-2009-0040268, filed May 8, 2008, with the Korean Intellectual Property Office, where the entire contents are incorporated herein by reference.

BACKGROUND OF THE INVENTION

1. Field of the Invention

The present invention relates generally to snap rings and, more particularly, to a snap ring having multiple rollers which couples a purse line and a purse seine, which are used for fishing, to each other.

2. Description of the Related Art

As well known to those skilled in the art, purse seines are one kind of fishing net and fishing equipment used for fishing for sardines, horse mackerels, mackerels, bonitos, tuna, etc. Such a purse seine and a conventional snap ring are illustrated in FIGS. 1 and 2.

As shown in FIGS. 1 and 2, a purse seine 110 has a rectangular shape, the central portion of which is slightly wider than other portions. Furthermore, a plurality of buoyancy units 120 is provided along the upper edge of the purse seine 110 in order to make it possible for the upper edge of the purse seine 110 to float on water, and bridle chains 125 are provided under the lower edge of the purse seine 110 so as to make it possible for the lower edge of the purse seine 110 to sink under the water surface. Thus, the buoyancy units 120 and the bridle chains 125 can orient the purse seine 110 upright in the water. Typically, the purse seine 110 expands in the water into an approximately circular shape so as to catch fish.

Furthermore, a purse line 130 which is used to haul in the purse seine 110 which has expanded into a circular shape is disposed along the lower edge of the purse seine 110. The purse line 130 is coupled to ends of the bridle chains 125 through connectors which are called snap rings 140. In detail, connection members 127 such as ropes are connected to the ends of the bridle chains 125. Each connection member 127 is connected to a first end of the corresponding snap ring 140. The purse line 130 passes through second ends of the snap rings 140, thereby coupling the purse line 130 to the bridle chains 125.

To haul in the purse seine 110, when the purse line 130 is pulled by a hydraulic purse winch provided on a fishing boat 150, the bridle chains 125 of the purse seine 110 are also pulled, and thus fish are confined while the purse seine 110 is hauled in.

However, in the case of the snap ring 140 according to the conventional technique, due to the weight of the fish and the purse seine 110 being hauled in, a relatively large frictional force is generated on the contact surface between the purse line 130 and the snap rings 140, thus inducing extreme abrasion of the surfaces of the purse line 130 and the snap rings 140, possibly resulting in tearing. This seriously interferes with the fishing operation. Furthermore, maintenance costs increase due to frequent replacement of the purse line 130 or the snap ring 140, thus resulting in reduced income.

SUMMARY OF THE INVENTION

Accordingly, the present invention has been made keeping in mind the above problems occurring in the prior art, and an object of the present invention is to provide a snap ring having multiple rollers which is constructed such that the friction between a purse line and the snap ring is reduced, thus increasing the lifetime thereof, thereby reducing the cost of replacement thereof.

Another object of the present invention is to provide a snap ring having multiple rollers which can be assembled without using a separate fastening means for fastening shafts of the rollers to a frame, thus simplifying the assembly process, thereby reducing the production cost.

A further object of the present invention is to provide a snap ring having multiple rollers which includes a locking unit which is constructed such that even if a large load is applied to the frame by the weight of the purse seine and the purse line, the frame can be prevented from being damaged or undesirably opened, thus facilitating the process of hauling in the purse seine.

In order to accomplish the above object, the present invention provides a snap ring for coupling a purse line to a purse seine, including: a frame having a first end connected to the purse seine and a second end through which the purse line passes; a plurality of rollers rotatably provided in the frame at positions at which the purse line is brought into contact with the frame; a frame opening formed in one side part of opposite side parts of the frame to open the frame; and a locking unit coupled to the frame to openably close the frame opening. The locking unit includes a first cylinder coupled at a first end thereof to a part of the frame by a hinge, the part of the frame corresponding to a first end of the frame opening, the first cylinder being disposed at a second end thereof in the frame at a position corresponding to a second end of the frame opening, so that the frame opening is opened or closed by the locking unit depending on a rotation of the first cylinder around the hinge.

Preferably, one roller selected from the plurality of rollers may be disposed in one side part of the opposite side parts of the frame. A mounting notch may be formed in the frame to receive the one roller selected from the plurality of rollers therein.

In addition, one roller selected from the plurality of rollers may be provided in at least one side part of the opposite side parts of the frame, and another roller may be disposed to span the opposite side parts of the frame. A mounting notch may be formed in the frame to receive the one roller selected from the plurality of rollers therein.

As well, an end of a shaft which functions as a rotating axis for the roller provided in the one side part of the opposite side parts of the frame may engage with a corresponding end of a shaft which functions as a rotating axis for the roller disposed to span the opposite side parts of the frame.

The plurality of rollers may comprise: a first roller and a second roller respectively provided in the opposite side parts of the frame; and a third roller provided to span the opposite side parts of the frame, the third rollers being disposed such that both ends thereof respectively face the first roller and the second roller.

In the frame, the first roller may be provided in a first mounting notch, and the second roller may be provided in a second mounting notch. The first, second and third rollers may respectively have first, second and third shafts functioning as rotating axes for the corresponding rollers. First ends of the first and second shafts may be inserted into corresponding ends of the first and second mounting notches, and second ends of the first and second shafts may respectively engage with both ends of the third shaft.

Preferably, an insert depression may be formed in the end of the first mounting notch so that the first end of the first shaft is disposed in the insert depression. A hollow space may be formed in the insert depression to allow the first end of the first shaft to move in a longitudinal direction thereof. A cut may be formed in the third shaft so that the second end of the first shaft is fitted into the cut. When the first shaft is moved into the hollow space of the insert depression, the second end of the first shaft may be removed from the cut of the third shaft.

Furthermore, a mounting opening may be formed in the insert depression of the first mounting notch to allow the first end of the first shaft to be removed from the insert depression therethrough. The mounting opening may be openably closed by a stopper. The stopper may be held in the mounting opening by a fastening member which passes through the frame, the first shaft and the mounting opening in order.

In addition, a stepped portion may be formed in the third shaft at a position corresponding to the second shaft by depressing a corresponding portion of the third shaft such that a thickness thereof differs from a thickness of the other portion of the third shaft. The second shaft may stop the stepped portion of the third shaft only in one direction, so that when the second end of the first shaft is removed from the cut of the third shaft, the third shaft is allowed to be removed from the frame in a direction away from the second shaft.

The snap ring may further include an auxiliary roller provided in the frame at a position at which the frame is coupled to the purse seine.

Preferably, an auxiliary insert hole may be formed in the frame at positions corresponding to both ends of the auxiliary roller, and an auxiliary shaft may be inserted into the auxiliary insert hole. The auxiliary shaft may function as a rotating axis for the auxiliary roller. A stop portion may be provided in a first end of the auxiliary insert hole so that one end of the auxiliary shaft is stopped by the stop portion, and a removal prevention cap may be fitted into a second end of the auxiliary insert hole to prevent the auxiliary shaft from being removed from the auxiliary insert hole.

Moreover, a positioning protrusion may be provided on the second end of the first cylinder, and a locking guide may be provided on the frame at the position corresponding to the second end of the frame opening such that the locking guide engages with the positioning protrusion.

As well, a positioning protrusion may protrude from the second end of the first cylinder. The positioning protrusion may have a first inclined surface reduced in thickness in a direction in which the positioning protrusion protrudes. A locking guide may protrude from the frame at the position corresponding to the second end of the frame opening. The locking guide may have a second inclined surface corresponding to the first inclined surface of the positioning protrusion.

The second inclined surface may face the inside of the frame to prevent the first cylinder from moving out of the frame when the first inclined surface of the positioning protrusion is brought into contact with the second inclined surface of the locking guide by the rotation of the first cylinder around the hinge.

The locking unit may further include a second cylinder slidably provided around an outer surface of the first cylinder. When the frame opening is closed by the first cylinder, the second cylinder may slide on the first cylinder and cover the locking guide and the positioning protrusion.

The first cylinder may have a guide slot in a sidewall thereof, the guide slot extending a predetermined length in a longitudinal direction of the first cylinder. A guide pin may be placed through the guide slot and pass through the second cylinder. The guide pin may move along the guide slot to move the second cylinder in the longitudinal direction of the first cylinder such that the second cylinder is fitted over or removed from the locking guide.

Preferably, a first locking slot and a second locking slot may be respectively formed in first and second ends of the guide slot such that the guide pin moving along the guide slot is locked to the first or second locking slot.

Furthermore, a receiving space may be formed in the first cylinder, and an elastic unit may be placed in the receiving space. The elastic unit may include: an elastic member inserted into the receiving space; a movable member coupled to a first end of the elastic member, with an insert hole formed in the movable member so that the guide pin is inserted into the insert hole; and a stationary member coupled to a second end of the elastic member, the stationary member closing the receiving space. A first coupling part may be provided on the first end of the elastic member, the first coupling part being fastened to a first coupling depression formed in the movable member, and a second coupling part may be provided on the second end of the elastic member, the second coupling part being fastened to a second coupling depression formed in the stationary member. Hereby, when the guide pin is moved along the guide slot, the movable member is biased in a rotating direction because of elasticity of the elastic member, so that the guide pin is easily inserted into and locked to the first locking slot or the second locking slot.

Moreover, a receiving space may be formed in the first cylinder, and an elastic unit may be placed in the receiving space. The guide pin may be placed through the second cylinder, the guide slot and the receiving space in order. The guide pin may prevent the elastic unit from being removed from the receiving space. Thus, when the second cylinder is moved under guidance of the guide slot, the second cylinder is fitted over the locking guide by the elasticity of the elastic unit or is removed from the locking guide.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a snap ring having multiple rollers according to a preferred embodiment of the present invention will be described in detail with reference to the attached drawings.

Figure 1:
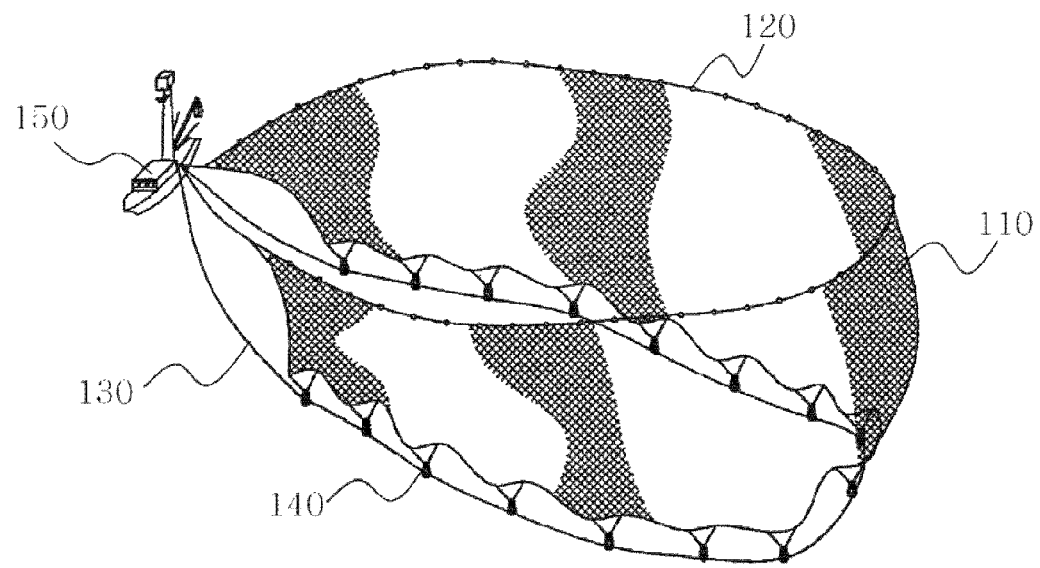
FIG. 1 is a perspective view showing a typical purse seine used in a commercial fishing operation.
Figure 2:
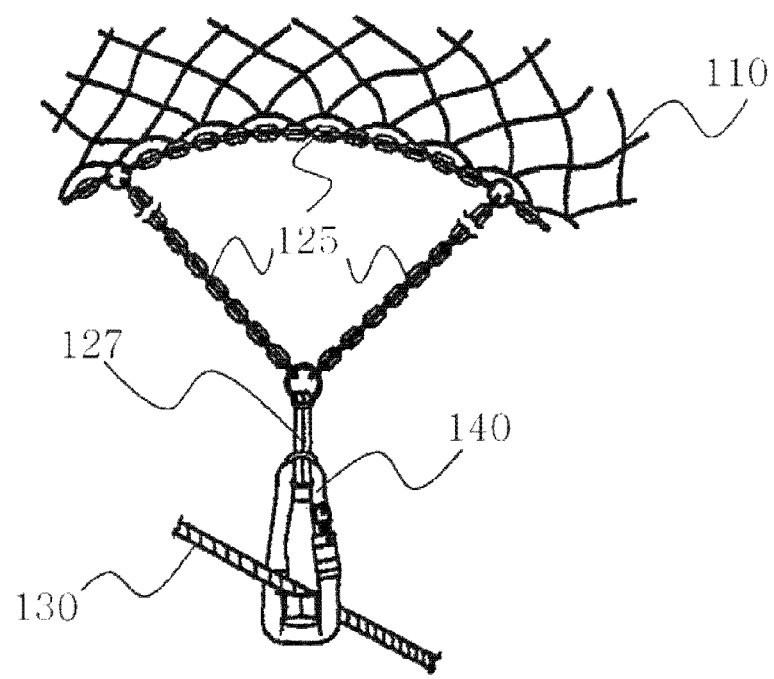
FIG. 2 is a perspective view of a conventional snap ring coupled to the purse seine.
Figure 3:
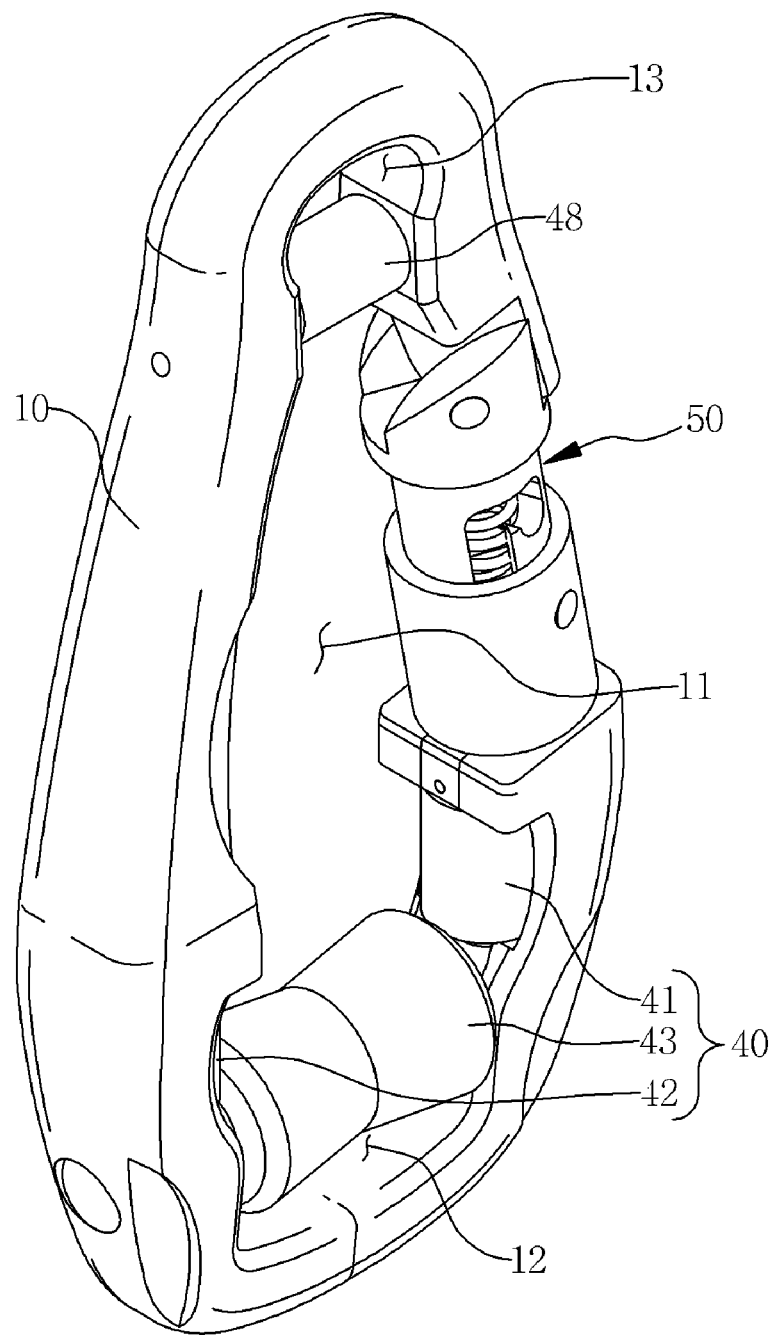
FIG. 3 is a perspective view illustrating a snap ring having multiple rollers, according to a preferred 1$^{st}$ embodiment of the present invention.

FIG. 3 is a perspective view illustrating the snap ring having multiple rollers, according to the preferred 1$^{st}$ embodiment of the present invention.

Referring to FIG. 3, the snap ring having multiple rollers according to the 1$^{st}$ embodiment of the present invention is used to connect a purse seine (not shown) to a purse line (not shown) when performing commercial fishing. The snap ring includes a frame 10, a first space 11, a locking unit 50, a second space 12, a third space 13, multiple rollers 40 and an auxiliary roller 48.

Preferably, the frame 10 has an elliptical shape such that the purse line can pass through the frame 10. Furthermore, the frame 10 may have any polygonal shape, as long as the purse line can sufficiently pass through the frame 10.

The first space 11 is a hollow space, which is defined in the frame 10 at the position at which the purse line passes through the frame 10. The purse line passes through the first space 11 and is disposed on the first end of the inner surface of the first space 11 in the frame 10 such that the purse line is brought into contact with a third roller 43 which will be explained later.

The locking unit 50 functions to open or close the first space 11 of the frame 10, and this will be described in detail later.

The second space 12 is a hollow space, which is defined between it and a first end of the frame 10 by the installation of the third roller 43. Thanks to the second space 12, the third roller 43 can be smoothly rotated.

The third space 13 is a hollow space into which a connection member (not shown) such as a rope which is coupled to one end of a bridle chain is inserted when the connection member is coupled to a second end of the frame 10. The third space 13 is defined by the auxiliary roller 48 which will be described later. As such, the connection member is coupled to the frame 10 through the third space 13.

The multiple rollers 40 serve to reduce frictional force which is generated at contact surfaces between the purse line and the snap ring by the weight of the fish and the purse seine being hauled in when a hydraulic purse winch pulls the purse line to land fish caught in the purse seine. The multiple rollers comprise a first roller 41, a second roller 42 and the third roller 43 which are disposed in the frame 10 at positions at which the purse line comes into contact with the inner surface of the frame 10, when the purse line is placed through the first space 11 of the frame 10. The multiple rollers will be described in detail later herein with reference to FIGS. 4 and 5.

The auxiliary roller 48 is provided in the second end of the frame 10 in a lateral direction to span opposite side parts of the inner surface of the second end of the frame 10, thus defining the third space 13 in the frame 10. Thus, when the connection member (not shown) provided on the purse seine is coupled to the second end of the frame 10, the connection member is inserted into the third space 13 which is defined by the auxiliary roller 48. The auxiliary roller 48 will be explained in more detail later.

In the 1$^{st}$ embodiment of the present invention, four rollers and three spaces have been illustrated as being provided, but the numbers thereof are not limited to these. Those skilled in the art will appreciate that the number of rollers and the number of spaces may be greater or less than these numbers.

Each of the multiple rollers 40 may have a cylindrical shape or a bow tie or hourglass shape, which is reduced in diameter from the opposite ends thereof to the central portion.

Preferably, each of the frame 10 and the rollers 40 may be made of stainless steel, or a corrosion-resistant alloy able to withstand force applied to the snap ring during fishing, or a mixture of substances having sufficient mechanical strength.

Figure 4:
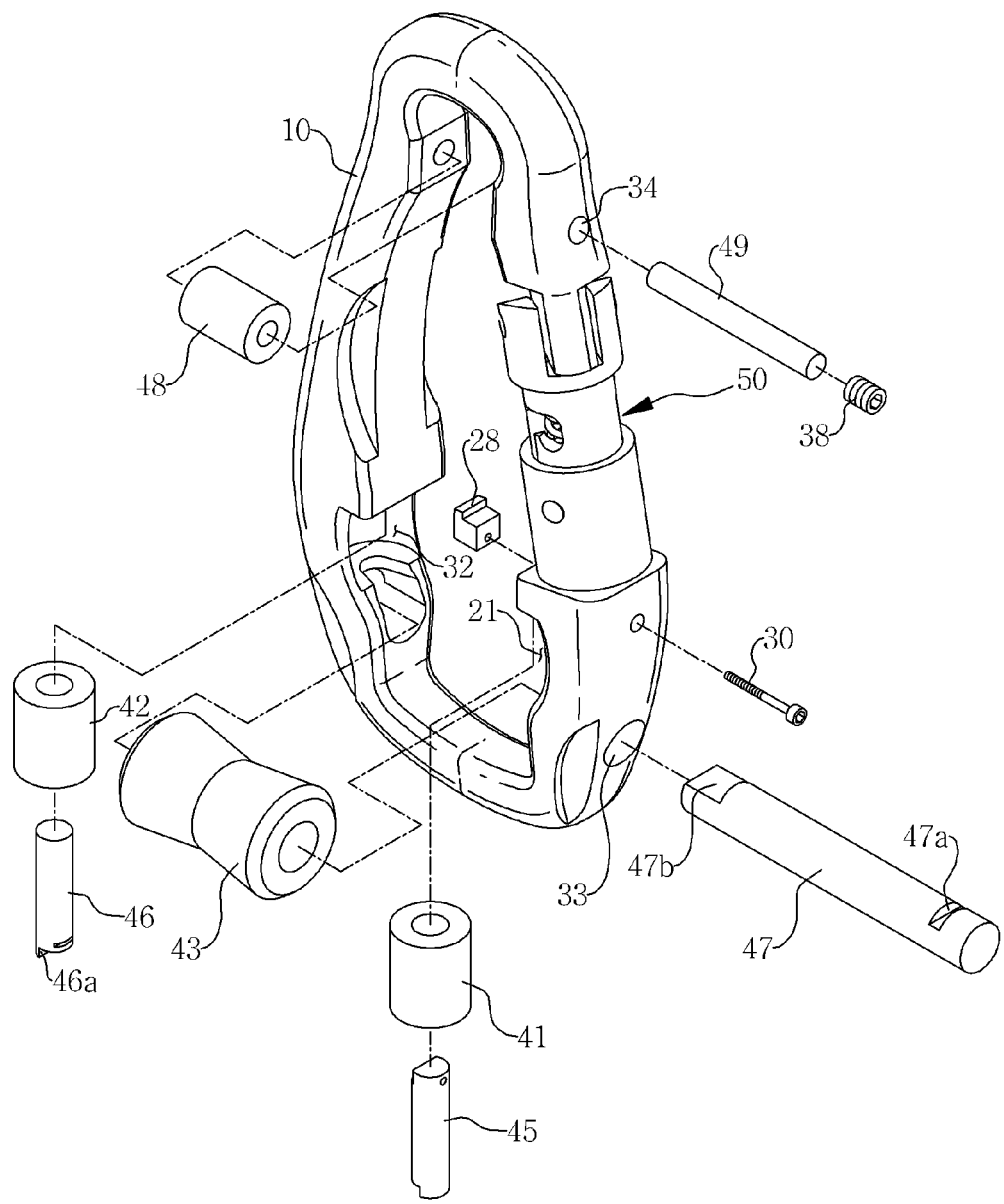
FIG. 4 is an exploded perspective view illustrating the snap ring according to the 1$^{st}$ embodiment of the present invention.
Figure 5:
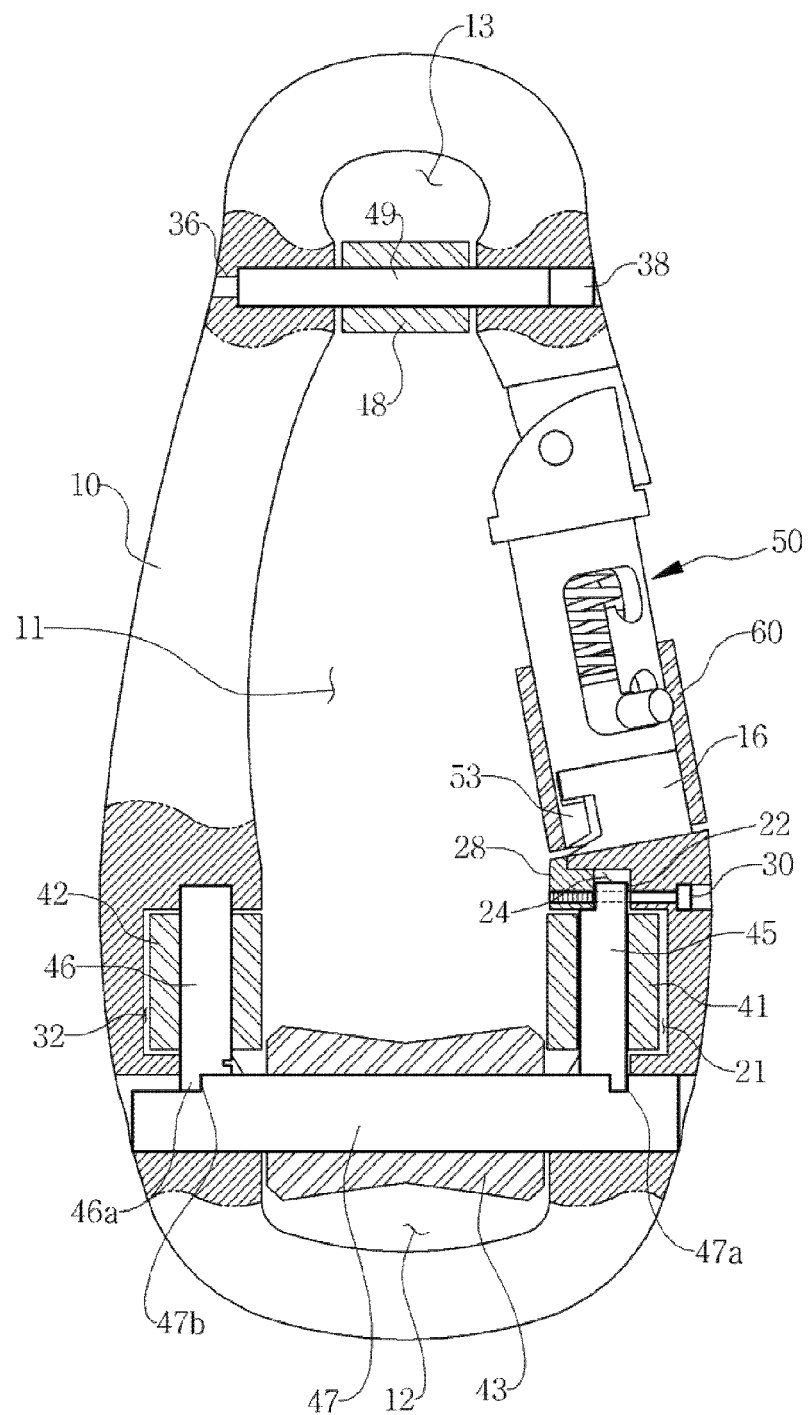
FIG. 5 is a partial sectional view illustrating the snap ring according to the 1$^{st}$ embodiment of the present invention.

FIG. 4 is an exploded perspective view of the snap ring according to the 1$^{st}$ embodiment of the present invention. FIG. 5 is a partial sectional view of the snap ring according to the 1$^{st}$ embodiment of the present invention.

Referring to FIGS. 4 and 5, the snap ring according to the 1$^{st}$ embodiment of the present invention includes the first roller 41, the second roller 42, the third roller 43 and the auxiliary roller 48.

The first roller 41 is provided in a first side part of the opposite side parts of the inner surface of the frame 10, the first side part of the frame 10 having the locking unit 126 therein. The first roller 41 is disposed at a position at which the purse line is brought into contact with the frame 10 when the purse line is inserted into the first space 11 of the frame 10 and is placed on the first end of the inner surface of the frame 10. The first roller 41 serves to reduce the frictional force between the purse line and the frame 10. Furthermore, a first mounting notch 21 is formed in the first side part of the frame 10 in which the first roller 41 is provided. A first shaft 45 which functions as a rotating axis for the first roller 41 is installed in the first mounting notch 21 in a direction that crosses the first mounting notch 21. The first roller 41 is rotatably fitted over the first shaft 45.

Furthermore, an insert depression 22 into which a first end of the first shaft 45 is inserted is formed in a first end of the first mounting notch 21 which is adjacent to the locking unit 50. A hollow space 24 is formed in the insert depression 22 to allow the first end of the first shaft 45 to move in the longitudinal direction thereof. The hollow space 24 enables a second end of the first shaft 45 to be removed from a cut 47a of the third shaft 47 which will be explained later. This will be explained in detail again in the description of FIG. 7.

In addition, a mounting opening 26 (refer to FIG. 7) is formed in the insert depression 22 of the first mounting notch 21 such that the first end of the first shaft 45 can be removed from the insert depression 22 through the mounting opening 26. Thus, the first shaft 45 can be inserted into or removed from the first mounting notch 21 through the mounting opening 26.

The mounting opening 26 is openably closed by a stopper 28. The stopper 28 is secured in the mounting opening 26 by a fastening member 30. In other words, the stopper 28 which openably closes the mounting opening 26 is maintained at a stationary position in the mounting opening 26 by the fastening member 30. The fastening member 30 may comprise a key or a hexagonal head bolt. The fastening member 30 is inserted into the frame 10, the first shaft 45 and the stopper 28 in order, such that the stopper 28 is removably held in the mounting opening 26.

The second roller 42 is provided in a second side part of the opposite side parts of the inner surface of the frame 116 which is opposite to the locking unit 50, at a position at which the purse line is brought into contact with the frame 10. The second roller 42 also serves to reduce the frictional force between the purse line and the frame 10. Furthermore, a second mounting notch 32 is formed in the second side part of the frame 10, in which the second roller 124 is provided. A first end of a second shaft 46 which functions as a rotating axis for the second roller 42 is inserted in a first end of the mounting notch 32. The second roller 42 is rotatably fitted over the second shaft 46.

A stop protrusion 46a is provided on a second end of the second shaft 46. The stop protrusion 46a is locked to a stepped portion 47b of the third shaft 47 which will be explained later. The third shaft 47 is stopped by the stop protrusion 46a when it tries to proceed in one direction. This will be explained in more detail in the description of FIG. 7.

The third roller 43 is provided in the first end of the frame 10 in a lateral direction spanning opposite side parts of the inner surface of the first end of the frame 10. Thus, the third roller 43 also functions to reduce the frictional force of the purse line inserted into the frame 10. Furthermore, insert holes 33 are formed through the opposite side parts of the first end of the frame 10. A third shaft 47 which functions as a rotating axis for the third roller 43 is inserted into the insert holes 33. The third roller 43 is rotatably fitted over the third shaft 47.

Here, the insert holes 33 are formed through the opposite side parts of the frame 10 such that the insert holes 33 communicate with the ends of the first mounting notch 21 and the second mounting notch 32.

The third shaft 47 which is inserted into the insert holes 33 can be prevented from being undesirably removed therefrom by the structure including the cut 47a and the stepped portion 47b.

In detail, the cut 47a is formed in the surface of the third shaft 47 at a position that corresponds to the second end of the first shaft 45 when the third shaft 47 is disposed in the insert holes 33. The second end of the first shaft 45 is fitted into the cut 47a of the third shaft 47. The stepped portion 47b is formed in the third shaft 47 at a position corresponding to the stop protrusion 46a of the second shaft 46. The stepped portion 47b is formed by depressing the corresponding end of the third shaft 47 such that the thickness thereof differs from that of the other portion of the third shaft 47.

Meanwhile, when the third roller 43 is fitted over the third shaft 47, both ends of the third roller 43 face the circumferential outer surfaces of the first and second rollers 41 and 42. Thus, the first and second rollers 41 and 42 are not removed from the frame 10, as long as the third roller 43 is not removed from the frame 10.

The auxiliary roller 48 is provided in the second end of the frame 10 in a lateral direction to span opposite side parts of the inner surface of the second end of the frame 10. Auxiliary insert holes 34 are formed in the opposite side parts of the second end of the frame 10. An auxiliary shaft 49 which functions as a rotating axis for the auxiliary roller 48 is inserted into the auxiliary insert holes 34. The auxiliary roller 48 is rotatably fitted over the auxiliary shaft 49.

A stop portion 36 which stops a first end of the auxiliary shaft 49 is formed in a first end of the auxiliary insert holes 34. A removal prevention cap 38 is fitted into a second end of the auxiliary insert holes 34 to prevent the auxiliary shaft 49 from being removed from the auxiliary insert holes 34, in other words, to keep the auxiliary shaft 49 in the auxiliary insert holes 34.

The connection member (not shown) coupled to the purse seine is inserted into the third space 13 which is defined in the frame 10 by the auxiliary roller 48. Furthermore, when the purse line is placed through the first space 11 of the frame 10, a first side of the purse line is brought into contact with the third roller 43, and a second side of the purse line is brought into contact with the auxiliary roller 48, thus further reducing the frictional force between the purse line and the frame 10.

As such, the snap ring according to the present invention can reduce the frictional force generated at the contact surfaces between the purse line and the frame 10 using the four rollers including the first, second and third rollers 41, 42 and 43 and the auxiliary roller 48.

Meanwhile, a frame opening 15 (refer to FIG. 9) is formed in the frame 10 such that when the purse line is placed into the first space 11 of the frame 10, the purse line can be easily inserted into the first space 11.

Furthermore, a first cylinder 51 of the locking unit 50 is hinged to a part of the frame 10 which corresponds to a first end of the frame opening 15. A locking guide 16 is provided on a part of the frame 10 which corresponds to a second end of the frame opening 15. A positioning protrusion 53 of the locking unit 50 removably engages with the locking guide 16 to openably close the frame opening 15. This will be explained in detail later when describing FIG. 9.

Figure 6:
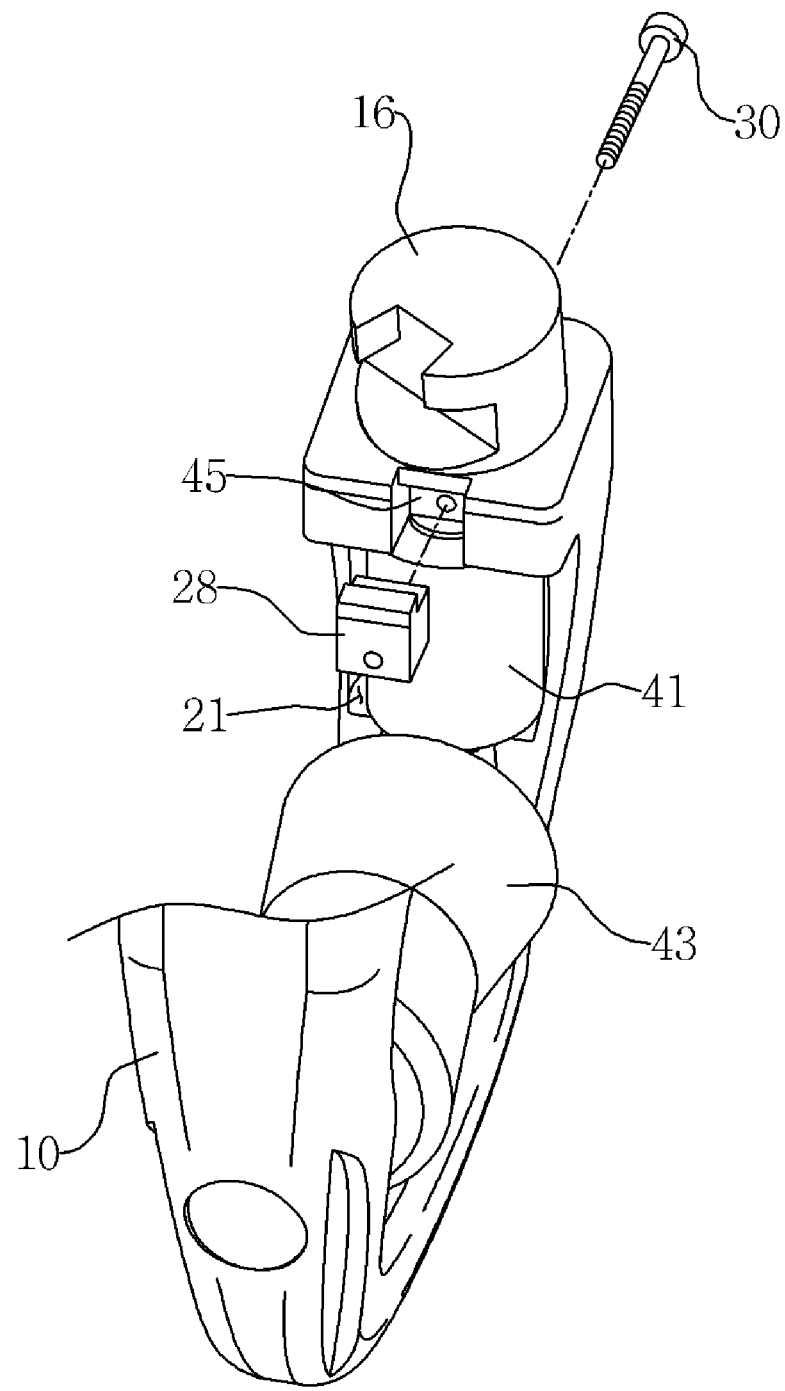
FIG. 6 is a view illustrating a process of opening a stopper of the snap ring according to the 1$^{st}$ embodiment of the present invention.
Figure 7:
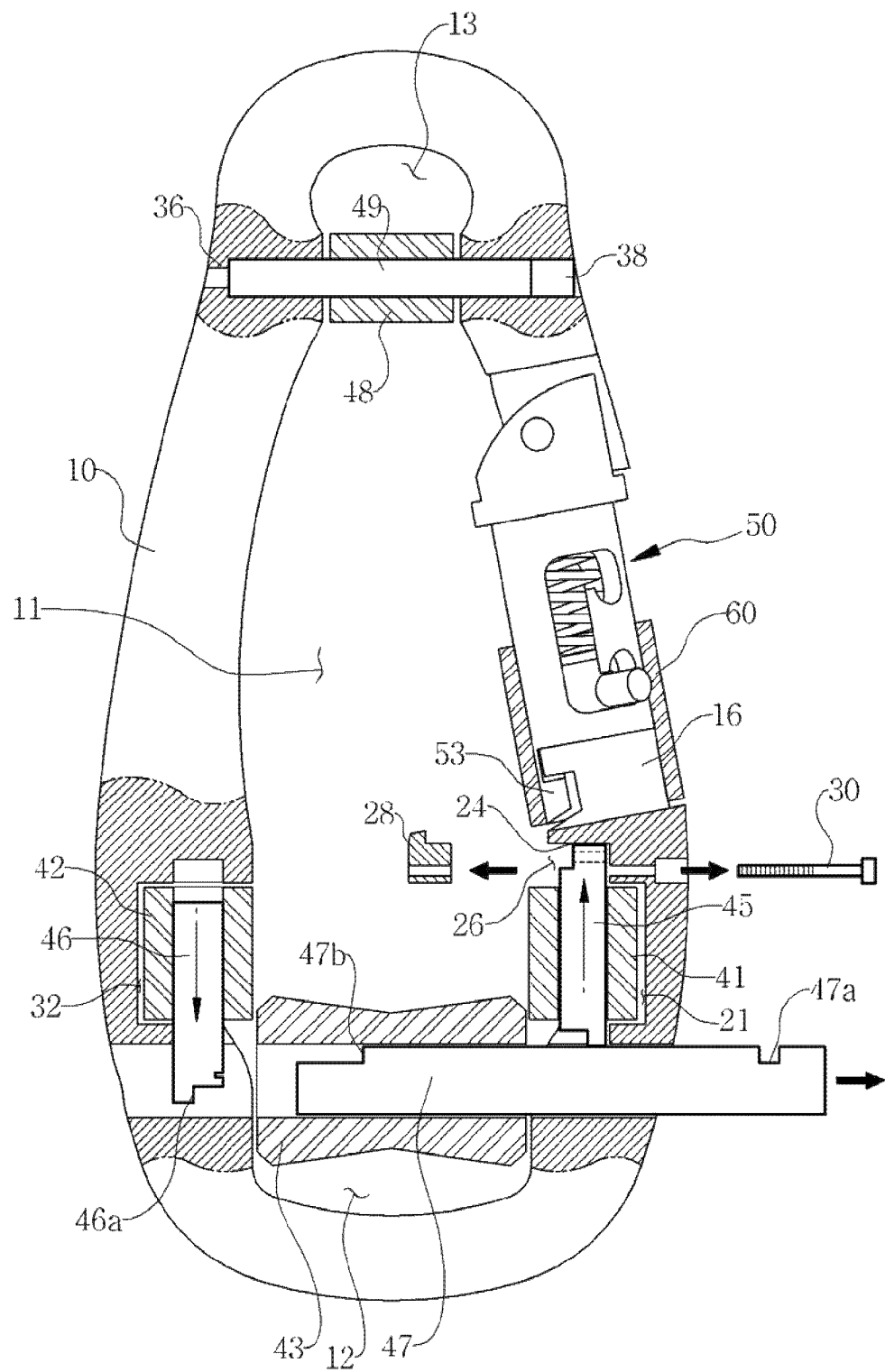
FIG. 7 is a view illustrating a process of disassembling the snap ring according to the 1$^{st}$ embodiment of the present invention.

FIG. 6 is a view illustrating a process of opening the stopper 28 of the snap ring according to the 1$^{st}$ embodiment of the present invention. FIG. 7 is a view illustrating a process of disassembling the snap ring according to the 1$^{st}$ embodiment of the present invention.

Referring to FIGS. 6 and 7, the snap ring according to the 1$^{st}$ embodiment of the present invention has a simple construction, thus making the assembly and disassembly thereof easy. Hereinafter, the disassembly of the snap ring will be explained.

First, the stopper 28 which closes the mounting opening 26 is removed therefrom. The stopper 28 can be separated from the mounting opening 26 by removing the fastening member 30 from the stopper 28, the first shaft 45 and the frame 10. Thereafter, the first end of the first shaft 45 is moved towards the hollow space 24, so that the second end of the first shaft 45 is removed from the cut 47a of the third shaft 47.

Here, the thick part of the stepped portion 47b of the third shaft 47 is stopped by the stop protrusion 46a of the second shaft 46 with respect to the longitudinal direction of the third shaft 47, and the thin part of the stepped portion 47b is not stopped by the stop protrusion 46a. In other words, when the stepped portion 47b of the third shaft 47 engages with the stop protrusion 46a of the second shaft 46, the third shaft 47 can no longer move in the direction approaching the second shaft 46, while it can move in the direction away from the second shaft 46. Therefore, after the first shaft 45 is removed from the cut 47a of the third shaft 47, the third shaft 47 is removed from the insert holes 33 by moving it in the direction away from the second shaft 46. Thereafter, the third roller 43 is also removed from the frame 10.

After the third roller 43 is removed from the frame 10, the first and second shafts 45 and 46 are moved towards the insert holes 33. Thus, the first and second rollers 41 and 42 can also be easily removed from the frame 10.

As such, in the snap ring according to the 1$^{st}$ embodiment of the present invention, if the stopper 28 which has closed the mounting opening 26 is removed by loosening the fastening member 30, the third roller 43, the first roller 41 and the second roller 42 can be easily removed from the frame 10 in order. Hence, the present invention does not require a separate fastening means for fastening each of the second and third shafts 46 and 47 to the frame 10, thus making the assembly process and the disassembly process easy. The simplification of the assembly of the snap ring can reduce the production cost thereof. In addition, even if parts of the snap ring malfunction or become worn, replacing just the malfunctioning or worn parts with new ones can easily be performed.

Figure 8:
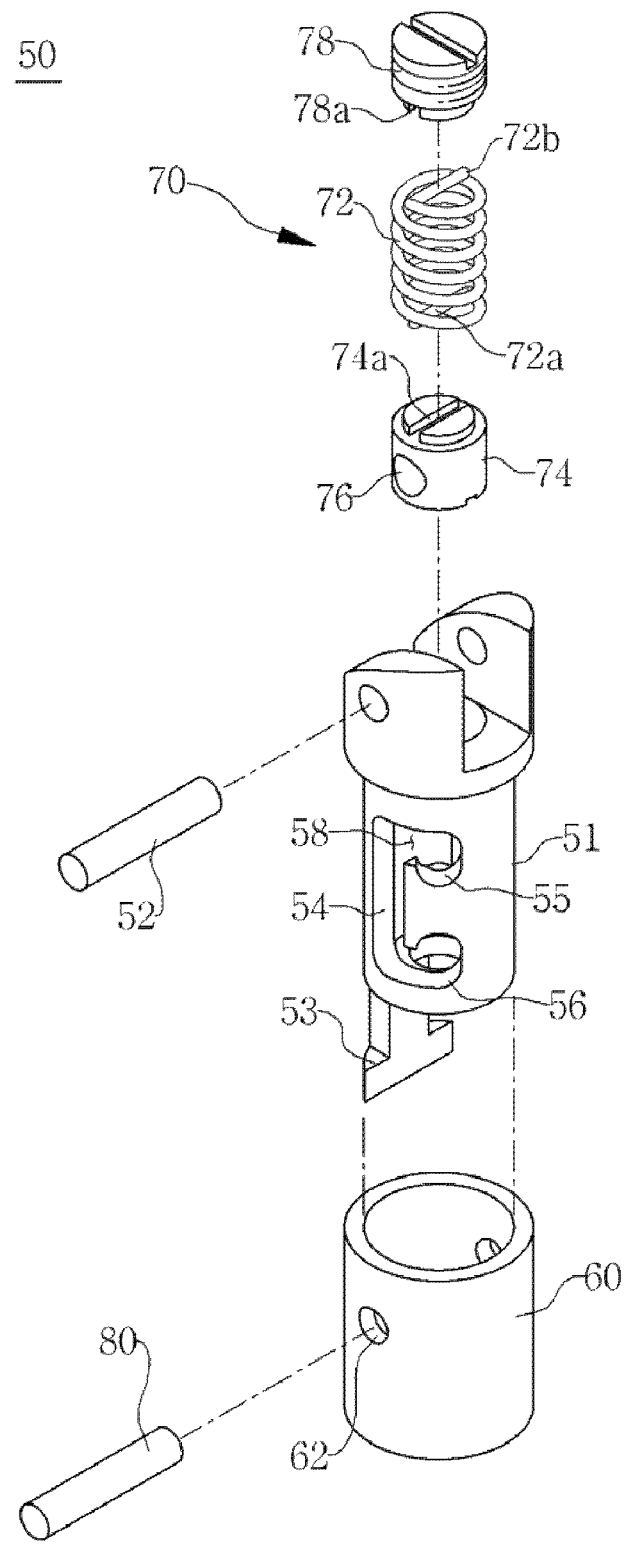
FIG. 8 is an exploded perspective view of a locking unit of the snap ring according to the 1$^{st}$ embodiment of the present invention.

FIG. 8 is an exploded perspective view of the locking unit 50 of the snap ring according to the 1$^{st}$ embodiment of the present invention.

Referring to FIG. 8, the locking unit 50 of the snap ring functions to openably close the frame opening 15 which is formed in the frame 10 such that when the purse line is placed into the first space 11 of the frame 10, the purse line can be easily inserted into the first space 11. Furthermore, the locking unit 50 includes the first cylinder 51, a second cylinder 60 and an elastic unit 70.

The first cylinder 51 is disposed in the first end of the frame opening 15 and is rotatably coupled at a first end thereof to the frame 10 by a hinge pin 52. The positioning protrusion 53 is provided on a second end of the first cylinder 51.

The positioning protrusion 53 protrudes from the first cylinder 51 towards the second end of the frame opening 15. Extensions extend predetermined lengths from the distal end of the positioning protrusion 53 in both lateral directions. The locking guide 16 is provided on the part of the frame 10 which corresponds to the second end of the frame opening 15. Thus, when the first cylinder 51 is rotated and placed in the frame opening 15, the positioning protrusion 53 is inserted into and engaged with the locking guide 16. In this state, the positioning protrusion 53 maintains the state in which it is locked to the locking guide 16, if the first cylinder 51 is not rotated around the hinge pin 52.

Furthermore, a guide slot 54 is longitudinally formed in one surface of the first cylinder 51. A guide pin 80 is placed in the guide slot 54 in a direction perpendicular to the longitudinal direction of the first cylinder 51 so as to be movable along the guide slot 54. A first locking slot 55 and a second locking slot 56 are respectively formed in first and second ends of the guide slot 54. The guide pin 80 is locked to the first or second locking slot 55 or 56. As such, the guide pin 80 is moved along the guide slot 54, and, when the guide pin 80 is locked to the first or second locking slot 55 or 56 of the guide slot 54, the movement thereof is limited.

In addition, a receiving space 58 is formed in the first cylinder 51 and is open through one end of the first cylinder 51 such that the elastic unit 70 is inserted into the receiving space 58 through the open end of the first cylinder 51.

The elastic unit 70 includes an elastic member 72, a movable member 74 and a stationary member 78. The elastic member 72 is made of elastic material and is inserted into the receiving space 58 through the open end of the first cylinder 51. The movable member 74 is coupled to a first end of the elastic member 72. An insert hole 76 is formed in the movable member 74 so that the guide pin 80 is inserted into the insert hole 76. The stationary member 78 is coupled to the elastic member 72 and closes the receiving space 58.

In the embodiment, the elastic member 72 comprises a compression spring. A first coupling part 72a which is provided on the first end of the elastic member 72 is fitted into a first coupling depression 74a which is formed in the movable member 74. A second coupling part 72b which is provided on the second end of the elastic member 72 is fitted into a second coupling depression 78a which is formed in the stationary member 78. As such, because the first end of the elastic member 72 is fastened to the movable member 74 and the second end thereof is fastened to the stationary member 78, even though the movable member 74 is rotated around its own axis by external force, the movable member 74 can be returned to its original position by the elastic force of the elastic member 72. Therefore, when the guide pin 80 is removed from the first locking slot 55 or the second locking slot 56 by rotating the movable member 74 towards the guide slot 54, the movable member 74 is automatically biased by the elastic force of the elastic member 72 in the reverse direction, that is, towards the first locking slot 55 or the second locking slot 56.

The second cylinder 60 has a hollow structure such that the first cylinder 51 is inserted thereinto. After the first cylinder 51 is rotated around the hinge pin 52 such that the frame opening 15 is closed, the second cylinder 60 slides on the first cylinder 51 and thus covers the positioning protrusion 53 and the locking guide 16 which engage with each other. Hereby, the positioning protrusion 53 of the first cylinder 51 is prevented from being removed from the locking guide 16.

Therefore, even if a large load is applied to the frame 10 by the weight of the purse seine and the purse line, because the positioning protrusion 53 and the locking guide 16 can maintain the locked state, the locking unit 50 can reliably close the frame opening 15. Thereby, the purse seine can be prevented from being stuck to the frame 10.

Meanwhile, in order to realize the structure such that when the guide pin 80 moves along the guide slot 54 of the first cylinder 51, the second cylinder 60 can move along with the guide pin 80, a fitting hole 62 is formed at a predetermined position in the second cylinder 60, and the guide pin 80 is fitted into the fitting hole 62 of the second cylinder 60 and is placed in the guide slot 54 of the first cylinder 51.

The operation of moving the guide pin 80 from the first locking slot 55 to the second locking slot 56 under the guidance of the guide slot 54 will be explained. As soon as the guide pin 80 is removed from the first locking slot 55, the movable member 74 is advanced by the elastic force of the elastic member 72 along the guide slot 54. Subsequently, as soon as the movable member 74 faces the second locking slot 56, the guide pin 80 is automatically inserted into the second locking slot 56 by the elastic force of the elastic member 72 which has been twisted when the guide pin 80 was removed from the first locking slot 55. Here, when the movable member 74 is advanced, the second cylinder 60 also advances. The frame 10 is completely closed by the advancement of the second cylinder 60. When the guide pin 80, along with the movable member 74, is inserted into the second locking slot 56, the second cylinder 60 is locked in the state in which it completely closes the frame 10. The above-mentioned operation will be explained in more detail in the description of FIGS. 9 and 10.

Figure 9:
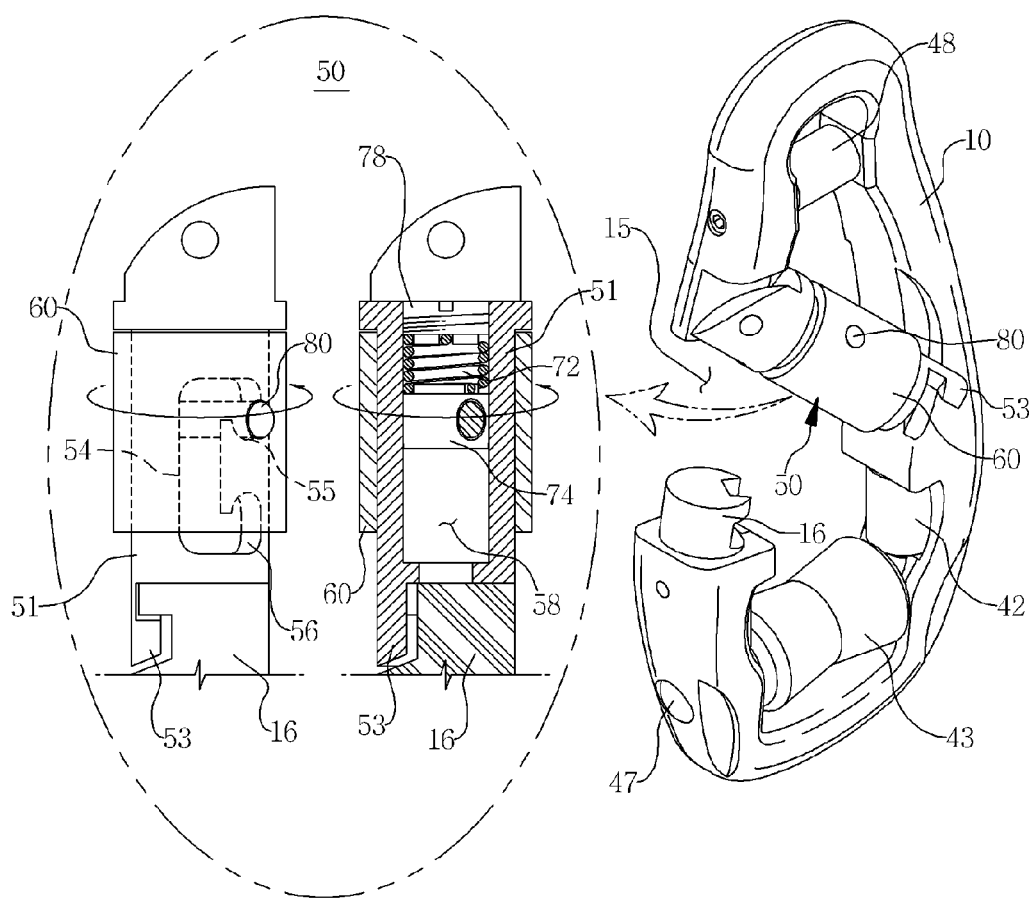
FIGS. 9 and 10 are respectively views illustrating the opened state and the closed state of the locking unit of the snap ring according to the 1$^{st}$ embodiment of the present invention.
Figure 10:
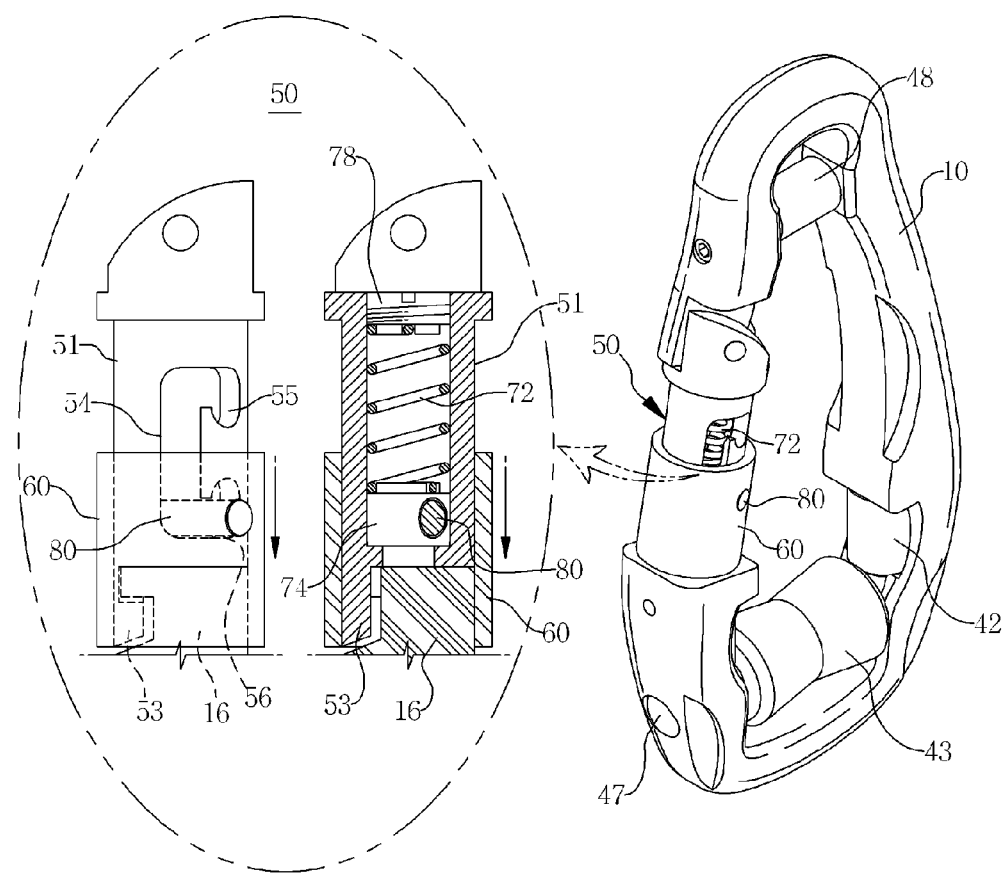

FIGS. 9 and 10 are respectively views illustrating the opened state and the closed state of the locking unit 50 of the snap ring according to the 1$^{st}$ embodiment of the present invention.

FIG. 9 illustrates the opened state of the frame 10. To make the opened state of the frame 10, the second cylinder 60 is rotated in the direction in which the guide pin 80 which has been in the second locking slot 56 is removed therefrom. Thereafter, the second cylinder 60 is moved such that the guide pin 80 is moved along the guide slot 54 and inserted into the first locking slot 55.

In detail, when the guide pin 80 is removed from the second locking slot 56 by rotating the second cylinder 60, the movable member 74 is rotated on its own axis so that the elastic member 72 is twisted.

Subsequently, the second cylinder 60 is forcibly moved in the direction away from the locking guide 16 while overcoming the elastic force of the elastic member 72, and the guide pin 80 is simultaneously moved along the guide slot 54. Thereafter, the second cylinder 60 is rotated in the reverse direction such that the guide pin 80 is inserted into the first locking slot 55. At this time, the operation of rotating the second cylinder 60 in the reverse direction can be easily conducted by the elastic force of the elastic member 72 which has been in the twisted state. In other words, the guide pin 80 can be easily inserted into the first locking slot 55 by the elastic force and thus be prevented from being undesirably removed therefrom.

As such, when the second cylinder 60 is moved in the direction such that the guide pin 80 is moved from the second locking slot 56 to the first locking slot 55, the second cylinder 60 releases the locking guide 16 of the frame 10, so that the frame opening 15 of the frame 10 enters the openable state.

FIG. 10 illustrates the closed state of the frame opening 15. To make the closed state of the frame opening 15, the second cylinder 60 is rotated around its own axis in the direction in which the guide pin 80 which has been in the first locking slot 55 is removed therefrom.

At this time, the elastic member 72 which is provided in the first cylinder 51 is twisted. Simultaneously, the movable member 74 is automatically moved in the longitudinal direction of the locking unit 50 by the elastic force of the elastic member 72 which has been compressed. The guide pin 80 is moved along the guide slot 54 towards the second locking slot 56 by the movement of the movable member 74. When the guide pin 80 reaches the end of the guide slot 54 which is adjacent to the second locking slot 56, the guide pin 80 is automatically inserted into the second locking slot 56 by the elastic force of the elastic member 72 which has been twisted. As such, the guide pin 80 is easily inserted into the second locking slot 56 and prevented from being undesirably removed therefrom.

Furthermore, when the guide pin 80 is moved in the longitudinal direction and inserted into the second locking slot 56, the second cylinder 60 is also moved in the longitudinal direction and covers the positioning protrusion 53 and the locking guide 16 of the frame 10. Hereby, the frame opening 15 of the frame 10 is completely closed.

Meanwhile, although the snap ring according to the $1^{st}$ embodiment of the present invention has been illustrated as being connected to the purse line and the purse seine during fishing, the present invention is not limited to this. For example, in work using a thick rope or cable to which a large load is applied, the snap ring of the present invention may be used in such a way that the rope or cable is placed through the first space 11 of the frame 10, thus reducing frictional force between the frame 10 and the rope or cable.

Figure 11:
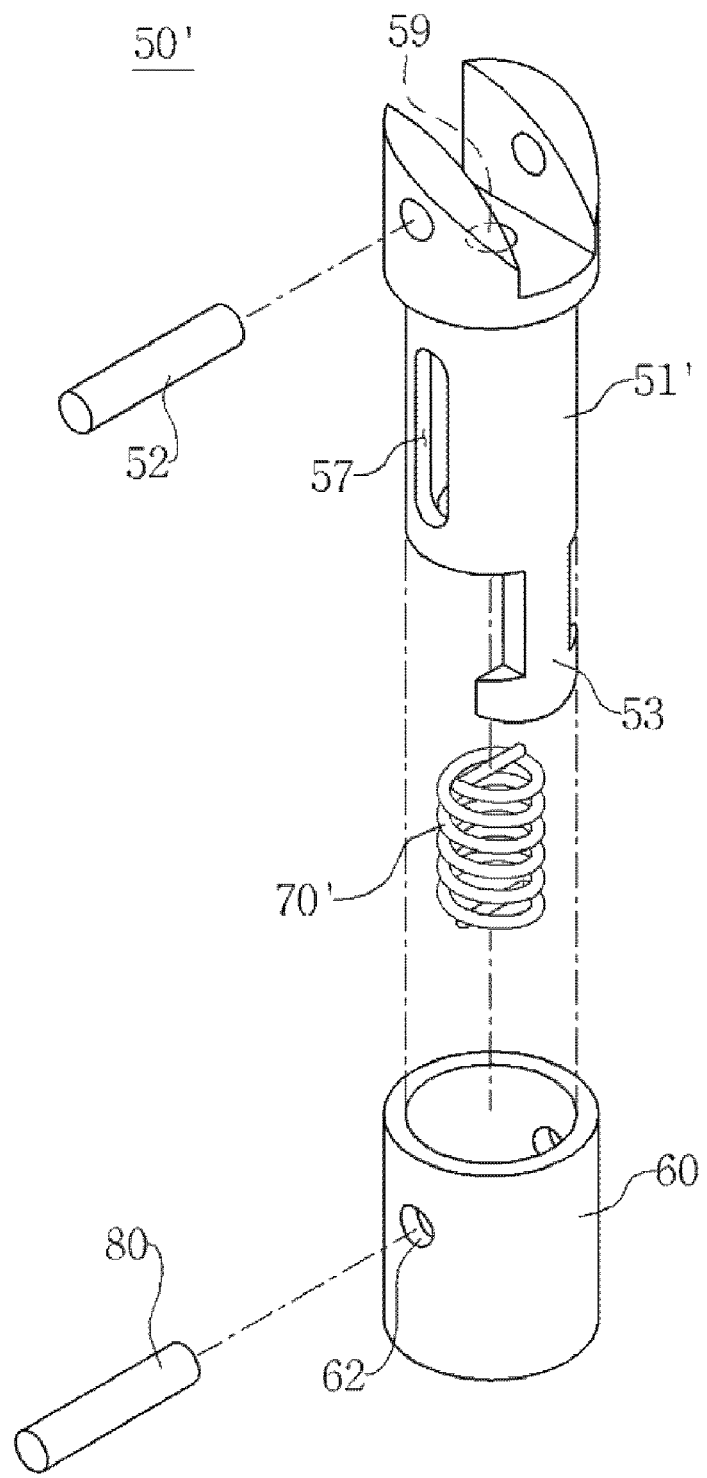
FIG. 11 is an exploded perspective view of a locking unit of a snap ring having multiple rollers, according to a 2$^{nd}$ embodiment of the present invention.

FIG. 11 is an exploded perspective view of a locking unit 50' of a snap ring having multiple rollers, according to a $2^{nd}$ embodiment of the present invention.

Referring to FIG. 11, the general structure of the locking unit 50' of the snap ring having multiple rollers according to the $2^{nd}$ embodiment of the present invention remains the same as that of the locking unit 50 (refer to FIG. 8) according to the $1^{st}$ embodiment, other than the structure of the first cylinder 51 (refer to FIG. 8) and the elastic unit 70 (refer to FIG. 8) of the $1^{st}$ embodiment.

Figure 12:
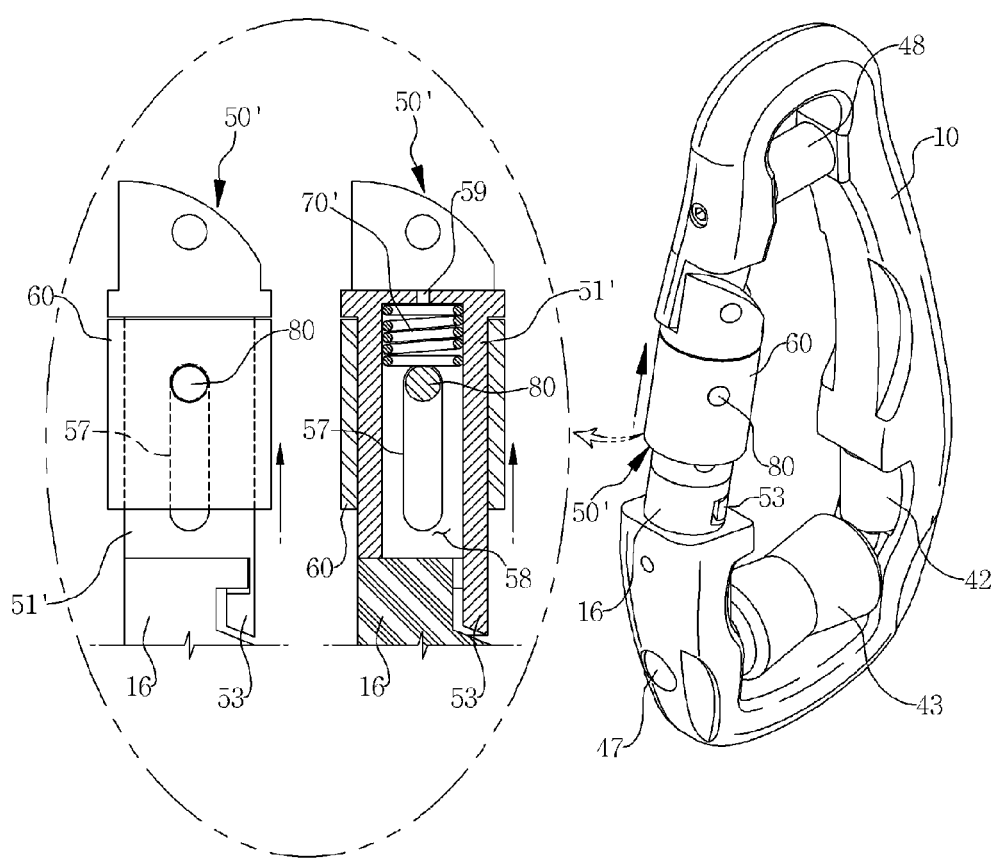
FIGS. 12 and 13 are of perspective views and a partial sectional view illustrating the operation of opening a frame opening of the snap ring according to the 2$^{nd}$ embodiment of the present invention.

The locking unit 50' of the snap ring having multiple rollers according to the $2^{nd}$ embodiment functions to openably close a frame opening 15 (refer to FIG. 13) of a frame 10 (refer to FIG. 12). Furthermore, the locking unit 50' includes a first cylinder 51', a second cylinder 60 and an elastic unit 70'.

The first cylinder 51' is disposed in the first end of the frame opening 15 and is rotatably coupled at a first end thereof to the frame 10 by a hinge pin 52. A positioning protrusion 53 is provided on a second end of the first cylinder 51'.

The positioning protrusion 53 protrudes from the first cylinder 51' towards the second end of the frame opening 15. Extensions extend predetermined lengths from the distal end of the positioning protrusion 53 in both lateral directions. A locking guide 16 (refer to FIG. 12) is provided on the part of the frame 10 which corresponds to the second end of the frame opening 15. Thus, when the first cylinder 51' is rotated and placed in the frame opening 15, the positioning protrusion 53 is inserted into and engaged with the locking guide 16. In this state, the positioning protrusion 53 maintains the state in which it is locked to the locking guide 16, if the first cylinder 51' is not rotated around the hinge pin 52.

Furthermore, a guide slot 57 is longitudinally formed in one surface of the first cylinder 51'. The guide slot 57 differs in shape from the guide slot 54 (refer to FIG. 8) of the $1^{st}$ embodiment. A guide pin 80 is placed in the guide slot 57 in a direction perpendicular to the longitudinal direction of the first cylinder 51' so as to be movable along the guide slot 57.

In addition, a receiving space 58 (refer to FIG. 12) is formed in the first cylinder 51' through the second end of the first cylinder 51'. The elastic unit 70' is inserted into the receiving space 58. A through hole 59 is formed through the first end of the first cylinder 51' so that water or the like drawn into the receiving space 58 through the open end of the first cylinder 51' can be rapidly discharged to the outside of the first cylinder 51' through the through hole 59.

The elastic unit 70' comprises a compression spring and is inserted into the receiving space 58 of the first cylinder 51'. Here, because the guide pin 80 is perpendicularly placed through the guide slot 57 of the first cylinder 51', the elastic unit 70' is prevented from being undesirably removed from the receiving space 58. The guide pin 80 is elastically moved along the guide slot 57 under the elastic force of the elastic unit 70' installed in the receiving space 58 of the first cylinder 51'.

The second cylinder 60 has a hollow structure such that the first cylinder 51' is inserted thereinto. When the frame opening 15 is closed by the rotation of the first cylinder 51' around the hinge pin 52, the second cylinder 60 slides along the first cylinder 51' and thus covers the positioning protrusion 53 and the locking guide 16 which engage with each other. Hereby, the positioning protrusion 53 of the first cylinder 51' is prevented from being removed from the locking guide 16.

Therefore, even if a large load is applied to the frame 10 by the weight of the purse seine and the purse line, because the positioning protrusion 53 and the locking guide 16 can reliably maintain the locked state, the locking unit 50 can reliably close the frame opening 15. Thereby, the purse seine can be prevented from being undesirably stuck to the frame 10.

Meanwhile, when the guide pin 80 is moved along the guide slot 57 of the first cylinder 51', the second cylinder 60 also moves along with the guide pin 80.

For this, a fitting hole 62 is formed in the second cylinder 60 at a position spaced apart from the end of the second cylinder 60 which is adjacent to the locking guide 16 of the frame 10 and is open. Thus, the locking guide 16 can be inserted into the open end of the second cylinder 60. The guide pin 80 is placed through the fitting hole 62 of the second cylinder 60, the guide slot 57 and the receiving space 58 of the first cylinder 51' in order.

When the second cylinder 60 is moved on the first cylinder 51' in the longitudinal direction, the guide pin 80 is also moved along with the second cylinder 60 in the longitudinal direction under the guidance of the guide slot 57. Here, the frame opening 15 is closed or opened depending on whether the locking guide 16 is inserted into or removed from the open end of the second cylinder 60. This operation will be explained in detail in the description of FIGS. 12 through 14.

Figure 13:
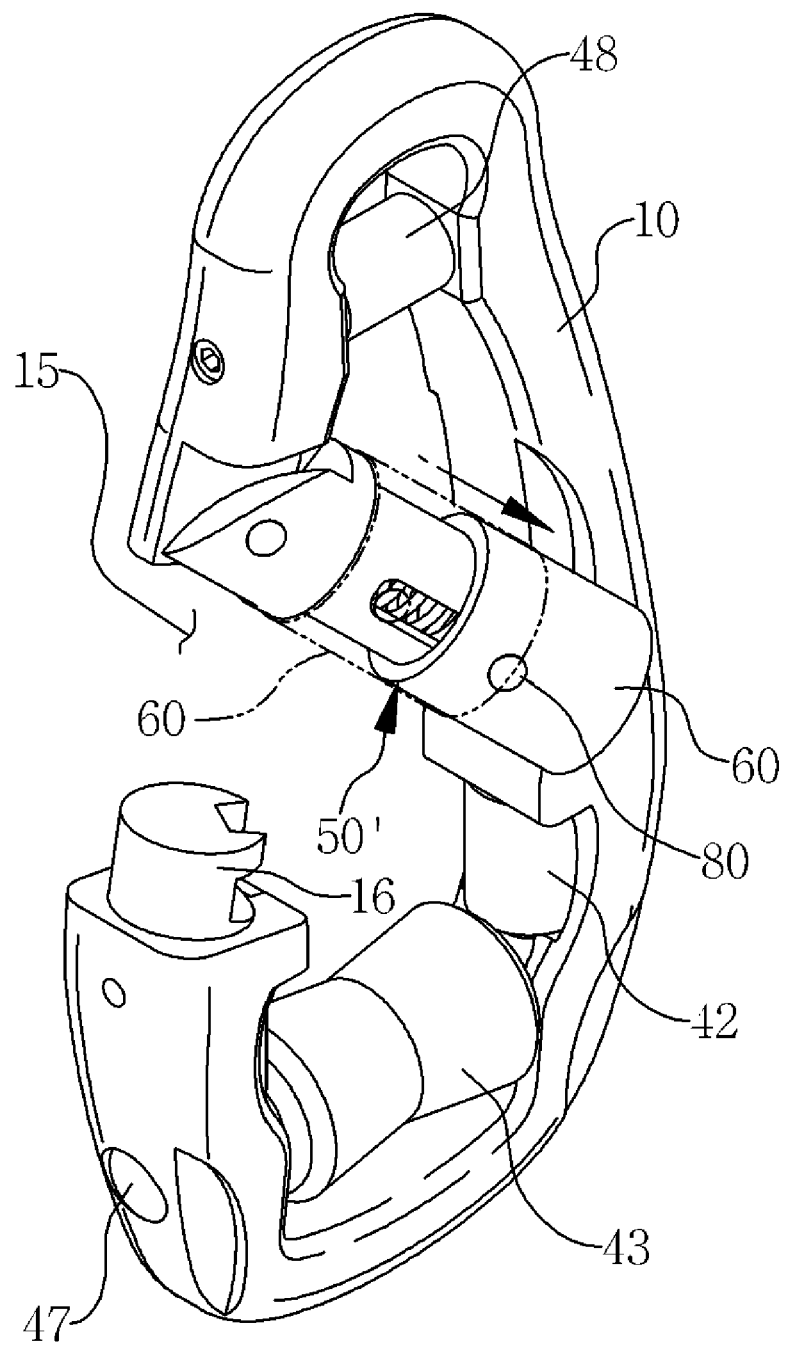

FIGS. 12 and 13 are of perspective views and a partial sectional view illustrating the operation of opening the frame opening 15 of the snap ring according to the $2^{nd}$ embodiment of the present invention.

First, referring to FIG. 12, the second cylinder 60 which has been biased to the second end of the first cylinder 51' by the elastic force of the elastic unit 70' is forcibly moved upwards while overcoming the elastic force of the elastic unit 70'.

Then, the guide pin 80 which is placed through the second cylinder 60 is also moved upwards along with the second cylinder 60. Because the guide pin 80 is also placed through the guide slot 57, when the guide pin 80 is moved upwards along the guide slot 57, it compresses the elastic unit 70'. Furthermore, when the second cylinder 60 is moved upwards, the open end of the second cylinder 60 which has covered the locking guide 16 is removed therefrom.

From the state in which, as shown in FIG. 12, the second cylinder 60 is moved upwards and thus removed from the locking guide 16, the first cylinder 51' is rotated around the hinge pin 52, as shown in FIG. 13. Then, the positioning protrusion 53 of the locking unit 50' which has engaged with the locking guide 16 is removed from the locking guide 16, and the frame opening 15 of the frame 10 is thus opened. Thereafter, the second cylinder 60 is automatically moved downwards on the first cylinder 51' by the elastic force of the elastic unit 70'.

Figure 14:
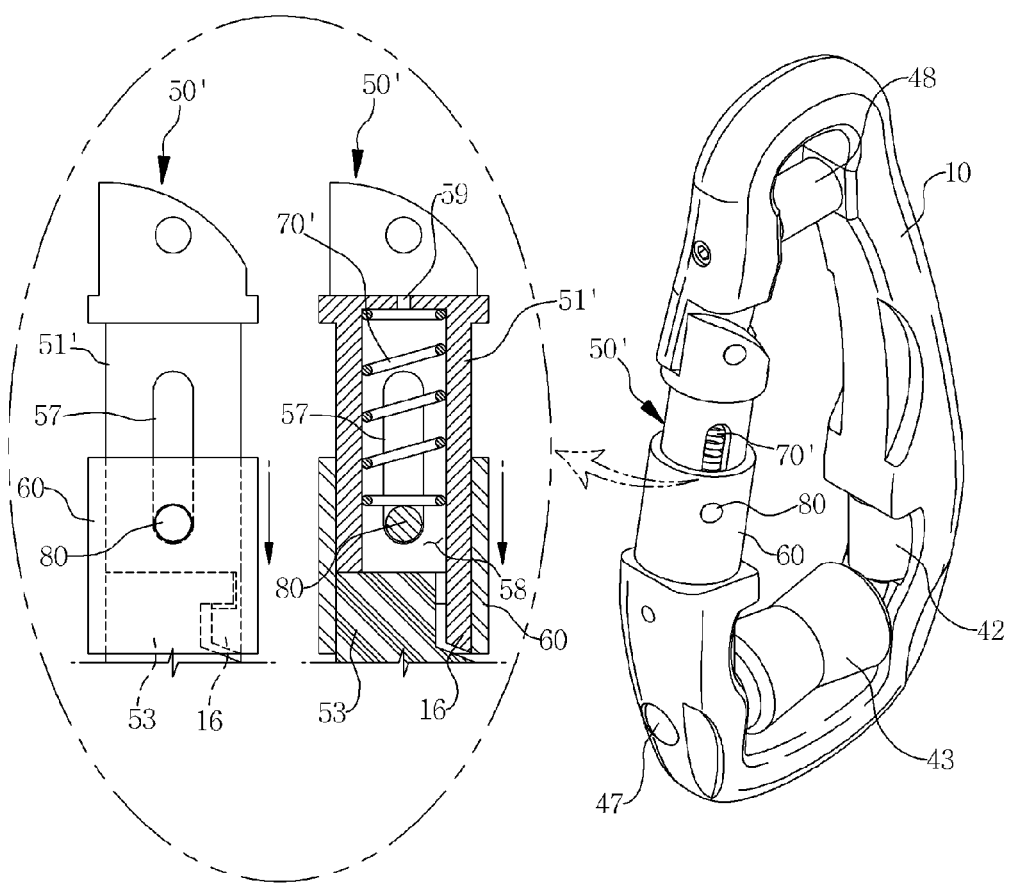
FIG. 14 is of a perspective view and a partial sectional view illustrating the closed state of the frame opening of the snap ring according to the 2$^{nd}$ embodiment of the present invention.

FIG. 14 is of a perspective view and a partial sectional view illustrating the closed state of the frame opening 15 of the snap ring according to the $2^{nd}$ embodiment of the present invention.

Referring to FIG. 14, the second cylinder 60 which has moved downwards on the first cylinder 51' because of the elastic force of the elastic unit 70' in FIG. 13 is forcibly moved upwards. Thereafter, the first cylinder 51' is rotated around the hinge pin 52 such that the positioning protrusion 53 engages with the locking guide 16. Subsequently, the second cylinder 60 is automatically moved on the first cylinder 51' downwards by the elastic force of the elastic unit 70' which has been compressed. Thus, the open end of the second cylinder 60 is fitted over the positioning protrusion 53 and the locking guide 16 of the frame 10. Ultimately, the frame opening 15 of the frame 10 is closed.

As such, the construction of the locking unit 50' of the snap ring according to the $2^{nd}$ embodiment of the present invention can be simplified compared to that of the locking unit 50 of the snap ring according to the $1^{st}$ embodiment. Therefore, the $2^{nd}$ embodiment of the present invention can further reduce the production cost thanks to having a simplified assembly.

Figure 15:
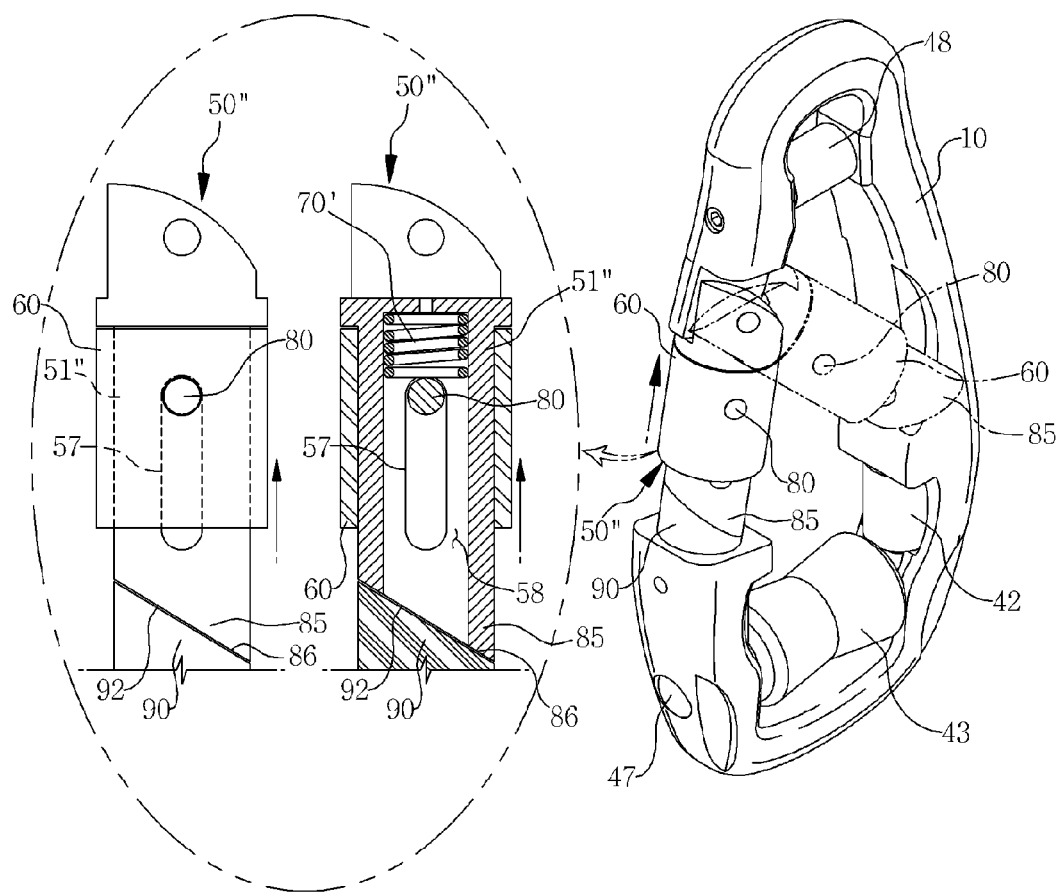
FIG. 15 is a perspective view of a locking unit of a snap ring having multiple rollers, according to a 3$^{rd}$ embodiment of the present invention.

FIG. 15 is a perspective view of a locking unit 50" of a snap ring having multiple rollers, according to a $3^{rd}$ embodiment of the present invention.

Referring to FIG. 15, the general structure of the locking unit 50" of the snap ring having multiple rollers according to the $3^{rd}$ embodiment of the present invention remains the same as that of the locking unit 50' according to the $2^{nd}$ embodiment, except for the structure of the positioning protrusion 53 (refer to FIG. 11) and the locking guide 16 (refer to FIG. 11) of the $2^{nd}$ embodiment.

In detail, the locking unit 50" of the snap ring having multiple rollers according to the $3^{rd}$ embodiment functions to openably close a frame opening 15 of a frame 10. Furthermore, the locking unit 50" includes a first cylinder 51", a second cylinder 60 and an elastic unit 70'.

The first cylinder 51" has on one surface thereof a guide slot 57 which extends a predetermined length in the longitudinal direction. A guide pin 80 is placed through the guide slot 57. The first cylinder 51" is rotatably coupled at a first end thereof to the frame 10 by a hinge pin 52. A positioning protrusion 85 is provided on a second end of the first cylinder 51".

The positioning protrusion 85 protrudes from the second end of the first cylinder 51" towards the second end of the frame opening 15. The positioning protrusion 85 has an inclined surface 86 which is formed by reducing the thickness of the positioning protrusion 85 from the proximal end to the distal end.

Furthermore, a locking guide 90 is provided on the part of the frame 10 which corresponds to the second end of the frame opening 15. In addition, the locking guide 90 has a second inclined surface 92 corresponding to the first inclined surface 86.

The second inclined surface 92 faces the inside of the frame 10. Thus, in a process of rotating the first cylinder 51" outwards around a hinge, when the first inclined surface 86 is brought into contact with the second inclined surface 92, the first cylinder 51" is prevented from moving out of the frame 10.

As such, the first cylinder 51" cannot be moved out of the frame 10 by the first and second inclined surfaces 86 and 92. Thus, the angular range within which the first cylinder 51" can rotate is limited. Furthermore, the corresponding end of the second cylinder 60 is fitted over or removed from the positioning protrusion 85 and the locking guide 90 depending on whether the second cylinder 60 moves upwards or downwards. Hereby, the frame opening 15 of the frame 10 enters the closed state or the openable state.

As described above, a snap ring having multiple rollers according to the present invention is constructed such that the multiple rollers can be easily removed from the frame in order only by removing a stopper from the frame. Therefore, the present invention does not require a separate fastening means for fastening shafts for the rollers to the frame, thus making the assembly process and the disassembly process easy. The simplification of the process of assembling the snap ring can reduce the production cost thereof. In addition, even if parts of the snap ring malfunction or are worn, replacing only the malfunctioning or worn parts with new ones has been made easy.

Furthermore, in the snap ring according to the present invention, even if a large load is applied to the frame by the weight of a purse seine and a purse line, because a positioning protrusion and a locking guide which engage with each other can reliably maintain the locked state, a locking unit can firmly close a frame opening of the frame and prevent the frame from being damaged and opened. Hereby, the purse seine can be prevented from getting stuck to the frame.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A snap ring for coupling a purse line to a purse seine, comprising:
    a frame having a first end connected to the purse seine and
        a second end through which the purse line passes;

a plurality of rollers rotatably provided in the frame at positions at which the purse line is brought into contact with the frame;

a frame opening formed in one side part of opposite side parts of the frame to open the frame; and a locking unit coupled to the frame to openably close the frame opening, wherein the locking unit comprises:

a first cylinder coupled at a first end thereof to a part of the frame by a hinge, the part of the frame corresponding to a first end of the frame opening, the first cylinder being disposed at a second end thereof in the frame at a position corresponding to a second end of the frame opening, so that the frame opening is opened or closed by the locking unit depending on a rotation of the first cylinder around the hinge, wherein one roller selected from the plurality of rollers is provided in at least one side part of the opposite side parts of the frame, and another roller is disposed to span the opposite side parts of the frame, wherein a mounting notch is formed in the frame to receive the one roller selected from the plurality of rollers therein, wherein the plurality of rollers comprises:

a first roller and a second roller respectively provided in the opposite side parts of the frame; and a third roller provided to span the opposite side parts of the frame, the third roller being disposed such that both ends thereof respectively face the first roller and the second roller, wherein in the frame, the first roller is provided in a first mounting notch, and the second roller is provided in a second mounting notch, and the first, second and third rollers respectively have first, second and third shafts functioning as rotating axes for the corresponding rollers, wherein first ends of the first and second shafts are inserted into corresponding ends of the first and second mounting notches, and second ends of the first and second shafts respectively engage with both ends of the third shaft, wherein an insert depression is formed in the end of the first mounting notch so that the first end of the first shaft is disposed in the insert depression, a hollow space is formed in the insert depression to allow the first end of the first shaft to move in a longitudinal direction thereof, and a cut is formed in the third shaft so that the second end of the first shaft is fitted into the cut, wherein when the first shaft is moved into the hollow space of the insert depression, the second end of the first shaft is removed from the cut of the third shaft, wherein a mounting opening is formed in the insert depression of the first mounting notch to allow the first end of the first shaft to be removed from the insert depression therethrough, the mounting opening being openably closed by a stopper, wherein the stopper is held in the mounting opening by a fastening member which passes through the frame, the first shaft and the mounting opening in order.

2. The snap ring as set forth in claim 1, wherein an end of a shaft which functions as a rotating axis for the roller provided in the one side part of the opposite side parts of the frame engages with a corresponding end of a shaft which functions as a rotating axis for the roller disposed to span the opposite side parts of the frame.

3. The snap ring as set forth in claim 1, wherein a stepped portion is formed in the third shaft at a position corresponding to the second shaft by depressing a corresponding portion of the third shaft such that a thickness thereof differs from a thickness of the other portion of the third shaft, wherein the second shaft stops the stepped portion of the third shaft only in one direction, so that when the second end of the first shaft is removed from the cut of the third shaft, the third shaft is allowed to be removed from the frame in a direction away from the second shaft.

4. The snap ring as set forth in claim 1, further comprising:

an auxiliary roller provided in the frame at a position at which the frame is coupled to the purse seine.

5. The snap ring as set forth in claim 4, wherein an auxiliary insert hole is formed in the frame at positions corresponding to both ends of the auxiliary roller, and an auxiliary shaft is inserted into the auxiliary insert hole, the auxiliary shaft functioning as a rotating axis for the auxiliary roller, wherein a stop portion is provided in a first end of the auxiliary insert hole so that one end of the auxiliary shaft is stopped by the stop portion, and a removal prevention cap is fitted into a second end of the auxiliary insert hole to prevent the auxiliary shaft from being removed from the auxiliary insert hole.

6. The snap ring as set forth in claim 1, wherein a positioning protrusion is provided on the second end of the first cylinder, and a locking guide is provided on the frame at the position corresponding to the second end of the frame opening such that the locking guide engages with the positioning protrusion.

7. The snap ring as set forth in claim 1, wherein a positioning protrusion protrudes from the second end of the first cylinder, the positioning protrusion having a first inclined surface reduced in thickness in a direction in which the positioning protrusion protrudes, and a locking guide protrudes from the frame at the position corresponding to the second end of the frame opening, the locking guide having a second inclined surface corresponding to the first inclined surface of the positioning protrusion.

8. The snap ring as set forth in claim 7, wherein the second inclined surface faces an inside of the frame to prevent the first cylinder from moving out of the frame when the first inclined surface of the positioning protrusion is brought into contact with the second inclined surface of the locking guide by the rotation of the first cylinder around the hinge.

9. The snap ring as set forth in claim 6, wherein the locking unit further comprises a second cylinder slidably provided around an outer surface of the first cylinder, wherein when the frame opening is closed by the first cylinder, the second cylinder slides on the first cylinder and covers the locking guide and the positioning protrusion.

10. The snap ring as set forth in claim 9, wherein the first cylinder has a guide slot in a sidewall thereof, the guide slot extending a predetermined length in a longitudinal direction of the first cylinder, and a guide pin is placed through the guide slot, the guide pin passing through the second cylinder, wherein the guide pin moves along the guide slot to move the second cylinder in the longitudinal direction of the first cylinder such that the second cylinder is fitted over or removed from the locking guide.

11. The snap ring as set forth in claim 10, wherein a first locking slot and a second locking slot are respectively formed in first and second ends of the guide slot such that the guide pin moving along the guide slot is locked to the first or second locking slot.

12. The snap ring as set forth in claim 10, wherein
a receiving space is formed in the first cylinder, and
an elastic unit is placed in the receiving space, the elastic unit comprising: an elastic member inserted into the receiving space; a movable member coupled to a first end of the elastic member, with an insert hole formed in the movable member so that the guide pin is inserted into the insert hole; and a stationary member coupled to a second end of the elastic member, the stationary member closing the receiving space,
wherein a first coupling part is provided on the first end of the elastic member, the first coupling part being fastened to a first coupling depression formed in the movable member, and a second coupling part is provided on the second end of the elastic member, the second coupling part being fastened to a second coupling depression formed in the stationary member,
whereby when the guide pin is moved along the guide slot, the movable member is biased in a rotating direction because of elasticity of the elastic member, so that the guide pin is easily inserted into and locked to the first locking slot or the second locking slot.

13. The snap ring as set forth in claim 10, wherein
a receiving space is formed in the first cylinder, and
an elastic unit is placed in the receiving space,
wherein the guide pin is placed through the second cylinder, the guide slot and the receiving space in order, the guide pin preventing the elastic unit from being removed from the receiving space, and
whereby when the second cylinder is moved under guidance of the guide slot, the second cylinder is fitted over the locking guide by elasticity of the elastic unit or is removed from the locking guide.

14. The snap ring as set forth in claim 7, wherein the locking unit further comprises a second cylinder slidably provided around an outer surface of the first cylinder,
wherein when the frame opening is closed by the first cylinder, the second cylinder slides on the first cylinder and covers the locking guide and the positioning protrusion.

* * * * *